US010816029B2

(12) United States Patent
Endo Arriagada

(10) Patent No.: US 10,816,029 B2
(45) Date of Patent: Oct. 27, 2020

(54) DEVICE FOR PREVENTING SPILLS FROM INSIDE MINING MILLS, SAID DEVICE MAINTAINING A SEAL AROUND BOLTS USED TO SECURE MILL LINERS, AND MAINTAINING SAID BOLTS UNDER TENSION BY MEANS OF AN ELASTIC ACTION

(71) Applicant: Alvaro Enrique Endo Arriagada, Santiago (CL)

(72) Inventor: Alvaro Enrique Endo Arriagada, Santiago (CL)

(73) Assignee: Alvaro Enrique Endo Arriagada, Santiago (CL)

( * ) Notice: Subject to any disclaimer, the term of this patent is extended or adjusted under 35 U.S.C. 154(b) by 256 days.

(21) Appl. No.: 15/770,355

(22) PCT Filed: Aug. 30, 2016

(86) PCT No.: PCT/CL2016/000050
§ 371 (c)(1),
(2) Date: Apr. 23, 2018

(87) PCT Pub. No.: WO2017/066892
PCT Pub. Date: Apr. 27, 2017

(65) Prior Publication Data
US 2018/0313392 A1    Nov. 1, 2018

(30) Foreign Application Priority Data

Oct. 23, 2015 (CL) .................................. 3138-2015

(51) Int. Cl.
*F16B 43/00* (2006.01)
*F16B 39/24* (2006.01)
*B02C 17/22* (2006.01)
*F16F 1/32* (2006.01)
(Continued)

(52) U.S. Cl.
CPC .............. *F16B 39/24* (2013.01); *B02C 17/22* (2013.01); *F16B 1/00* (2013.01); *F16B 31/043* (2013.01); *F16B 43/001* (2013.01); *F16F 1/32* (2013.01)

(58) Field of Classification Search
CPC ......... F16B 43/001; F16B 43/00; F16B 39/24
(Continued)

(56) References Cited

U.S. PATENT DOCUMENTS 2,915,152 A * 12/1959 Graham ................. B65D 90/08
403/288
3,149,850 A * 9/1964 Fischer ................. F16B 43/001
411/542
(Continued)

FOREIGN PATENT DOCUMENTS

DE    2337163 A1    2/1975
FR    2152279 A5    4/1973
GB     337911 A    11/1930

OTHER PUBLICATIONS

International Search Report for International Application No. PCT/CL2016/000050 dated Oct. 10, 2016, 3 pages.
(Continued)

*Primary Examiner* — Flemming Saether
(74) *Attorney, Agent, or Firm* — Hoffman Warnick LLC

(57) ABSTRACT

The invention relates to a device for preventing spills from inside mining mills, said device maintaining a seal around bolts used to secure mill liners, such that the bolt remains under tension within a range of several millimetres along the length between the head and the nut of the bolt, with the length covered by the elements compressed between the head of the bolt and the device for preventing pulp leaks in mills, exerting pressure on the washer that provides a seal against leaks from inside the mill. The device comprises one or more pairs of Belleville washers which include an annular
(Continued)

space into which a sleeve with an inner seal is inserted. Said sleeve includes a flange of larger diameter to allow the action of the bolt on the Belleville washers, said Belleville washers exerting pressure on the washer that provides a seal against leaks from inside the mill. The length of the sleeve is greater than or equal to the total thickness of the Belleville washers at maximum compression, and the flange of the sleeve is only required if the diameter inscribed on the contact surface with the bolt is smaller than the annular diameter of the Belleville washers.

6 Claims, 5 Drawing Sheets

(51) Int. Cl.
*F16B 31/04* (2006.01)
*F16B 1/00* (2006.01)

(58) Field of Classification Search
USPC .................................................. 411/542, 544
See application file for complete search history.

(56) References Cited

U.S. PATENT DOCUMENTS

| | | | | |
|---|---|---|---|---|
| 4,230,326 | A | * | 10/1980 | White ..................... B02C 17/22 |
| | | | | 16/2.2 |
| 4,371,120 | A | | 2/1983 | Grapin et al. |
| 5,082,387 | A | * | 1/1992 | DeVries .................. F16B 39/24 |
| | | | | 403/146 |
| 8,454,290 | B2 | * | 6/2013 | Schaser ................. F16B 5/0258 |
| | | | | 411/544 |
| 10,274,114 | B2 | * | 4/2019 | Otto ....................... F16B 31/028 |
| 2017/0009798 | A1 | * | 1/2017 | Archer .................... F16B 39/12 |
| 2018/0231145 | A1 | * | 8/2018 | Haight ................... F16L 3/1066 |

OTHER PUBLICATIONS

GSA S.A., Belleville Golillas—Flexible Tape Connecting Gollers—Pressure Gollers, Recovered from Internet: <http://www.gumpertz.cl/belleville.html>.

* cited by examiner

DEVICE FOR PREVENTING SPILLS FROM INSIDE MINING MILLS, SAID DEVICE MAINTAINING A SEAL AROUND BOLTS USED TO SECURE MILL LINERS, AND MAINTAINING SAID BOLTS UNDER TENSION BY MEANS OF AN ELASTIC ACTION

The present patent petition document is directed to a Device that prevents pulp leakage in mills, and avoids the loosening of clamping mill liners bolts.

Specifically, the Device allows maintaining the tension of the clamping linings bolts for a longer elongation between the head of the bolt in contact with the lining, and the fixing nut at the mill body.

STATE OF THE ART

Mills are equipped with interior linings fixed by bolts, that at one end hold the linings, and the other end is fastened to the mill body by a nut that locks and tensions the bolt, plus a cup-type washer with a seal, preventing material leakage from the inside to the outside of the mill.

During the operations of the mill, due to pieces tolerances, surface roughness, and characteristics of the materials that compose those pieces, it is produced looseness in the pieces and consequently produces loss of mechanical tension of the clamping linings bolts, losing the sealing capacity and generating leakages that can compromise the mill's availability, and damage mill key elements such as the motor system and mechanical breaks. In addition, this mechanical looseness is the cause damaged bolts by cut, and the irregular increase of size at the perforations in the mantle or mill heads through which the bolts go across.

The standard method used by the mining industry to avoid looseness is by applying additional torque to the nuts, in order to obtain an initial bolt tension between 50% and 75% of the bolt yield stress. And in some cases, repeat this operation within few hours or days of having installed the liners. In spite of the above, the problem is not completely eliminated, since the bolt only elongates, at most, 0.2% of its length with those high levels of tension applied on it. For example the elongation is only 1 mm for a bolt of 500 mm long. Despite the efforts made by the mining industry to control this problem it is common to lose the order of 40 hours of operation per mill, per year, due to leakages and damaged bolts by cuts. In addition to other incidents that can compromise key elements of the mills.

A conventional way for increasing the range of bolt elongation between the bolt head attached to the liner and the nut is by using pressure-type washers. However this solution is not practical, since the size of the pressure washers is limited by the size of the bolt and, in order to obtain acceptable forces and percentages of elongation to hold mill linings, several pressure-type washers assembles in series should be used. This would mean an increase in the dimension of the bolt that protrudes from the mantle of the mill, which evidently brings safety deterioration around the mill, possible interferences with structures and other elements, and a significant increase in bolt length. In addition, leakages can occur between the pressure-type washers and the bolts, causing spillage and limiting the elastic action of the washers.

The solution proposed in this patent petition document, will allow increasing by, at least 5 mm, and the range in which the bolt performs acceptable tension for clamping of linings, and will keep the sealing capacity against leakages from inside the mill, thereby avoiding spillage, protecting the key elements, and avoiding hours of stoppage of the mills.

DETAILED DESCRIPTION OF THE DEVICE

Figure 1:
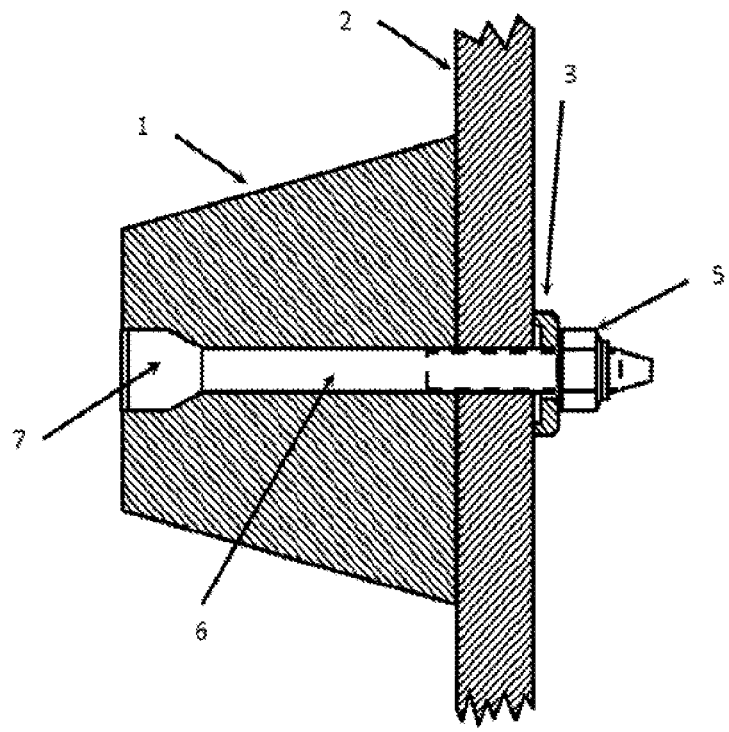
FIG. 1 shows a mill liner attached to the mill by the system currently used.

The Device prevents spillage from the inside of mining mills, maintains the sealing in fastening bolts (6) of mills' linings (1), allows a greater elongation between the head of the bolt (7) and its nut (5), and performs pressure on a washer (3), incorporates one or more pairs of Belleville washers (9), (11), in whose annular space it is installed a jacket (12) with an inner seal (8). The jacket has a flange (12.A) of appropriate diameter that will allow the action of the nut (5) on the Belleville washers (9), (11).

The length of the jacket in the annular space is greater or equal to the length occupied by the Belleville washers, when they are compressed.

Belleville washers (9) and (11) are arranged concave face against convex face or concave face against concave face.

The inner seal (8) is made of natural or synthetic elastomer material.

The Belleville washers (9), (11) are connected by their outer perimeter by mean of a perimeter seal (10).

The perimeter seal (10) is made of natural or synthetic elastomer material.

Optionally, the jacket (12) is configured with a jacket (13) with inner seal (8) of external diameter smaller than the annular space to the Belleville washers (9), (11), and a length greater or equal to the Belleville washers (9), (11) when compressed, and a washer (14) of enough diameter to allow the action of the nut (5) on the Belleville washers (9), (11).

The washer (14) is not required if the size of the nut allows that the Belleville washer (11) can lean on it.

The Device (4), that avoids pulp leakages in mills and the looseness of the fastening bolts of the mills' liners, is located between the washer (3) and the nut (5) of the bolt (6) that holds the lining (1) to the mantle of the mill (2). This device (4) works increasing the range of elongation between the head of the bolt (7) and its nut (5), maintaining a tension level of the bolt (6) that avoids spillage by the housing of the bolt (6) into the mantle of the mill (2), and the looseness of the bolt (6) with the lining (1).

FIG. 1 shows the current state of the art for fastening mills' liners (1) to the mill (2) by mean of a bolt (6) whose head (7) is locked to the liners (1), and that is fastened to the mill (2) by means of a washer (3) and a nut (5).

Figure 2:
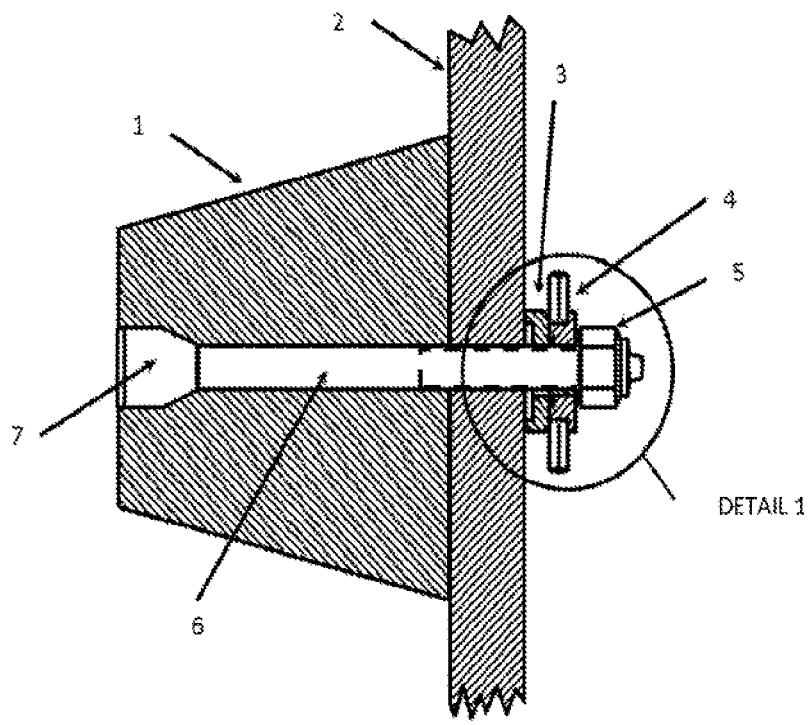
FIG. 2 shows the location of the Device of this patent petition document.

FIG. 2 shows the location of the Device (4) of this patent petition document, between the washer (3) and the nut (5).

Figure 3:
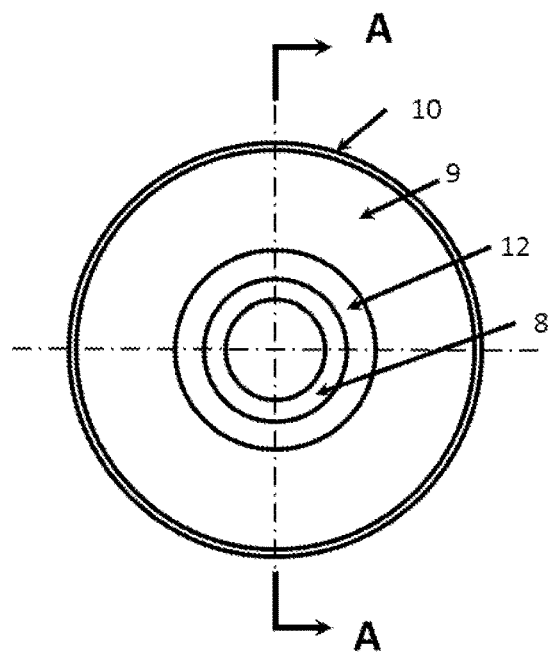
FIG. 3 shows a front view of the Device of this patent petition document.
Figure 4:
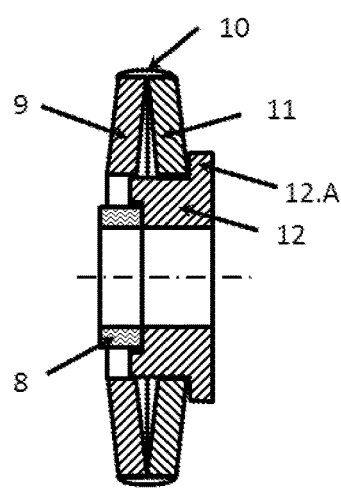
FIG. 4 shows a profile view in section A-A of the Device of this patent petition document.

FIGS. 3 and 4 show details of the front-view and section A-A profile of the Device components (4) for this patent petition document, that consists of an inner rubber sponge seal (8) or another elastomer material, that prevents leakages from the inside of the mill (2) when the Device (4) is compressed or expanded. The inner seal (8) is housed in the jacket (12) that also allows centering and compressing the Belleville washers (9), (11) that are assembled in series, facing each other by its concave face. In addition, the Belleville washes (9), (11) are assembled and sealed together by a perimeter seal (10) made-up of an elastomer material.

Figure 5:
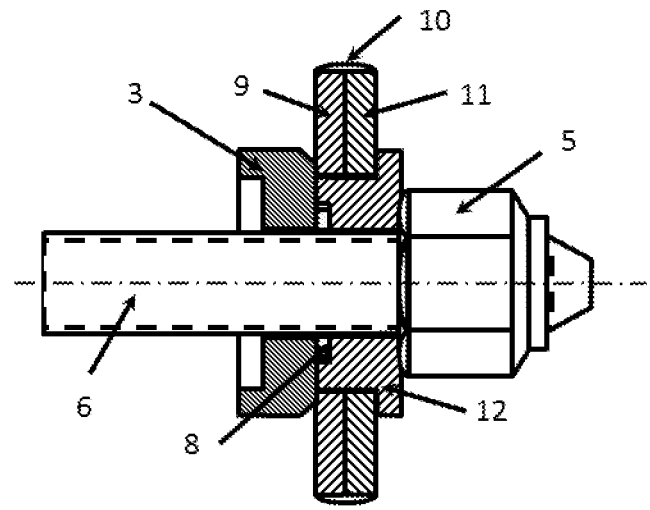
FIG. 5 shows the detail of FIG. 2, in which the Device of this patent petition document is in its compressed position.

FIG. 5 shows a detail of FIG. 1, where the Device (4) of this patent petition document is expanded, i.e., the distance between the head of the bolt (7) and its nut (5) is maximum for a tension on the bolt (6), that should avoid leakages from the inside of the mill (2).

Figure 6:
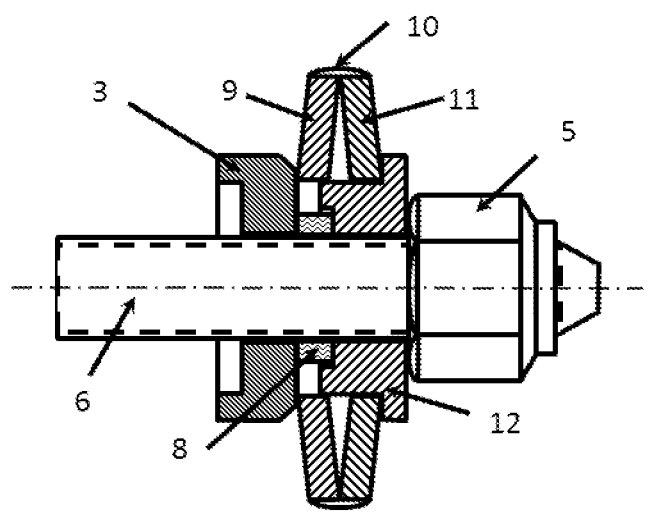
FIG. 6 shows detail of FIG. 2, in which the Device of this patent petition document is in its expanded position.

FIG. 6 shows the detail of the Device (4) components of this patent petition document, that consists of an inner rubber sponge seal (8), or other elastomer material, that prevents leakages from the inside the mill (2). When the Device (4) is compressed, the inner seal (8) is housed in the jacket (12), which also allows centering and compressing the Belleville washers (9), (11), assembles in series, facing each other by its concave face. In addition, the Belleville washers (9), (11) are assembled and sealed together by a perimeter seal (10) composed of an elastomer material.

Figure 7:
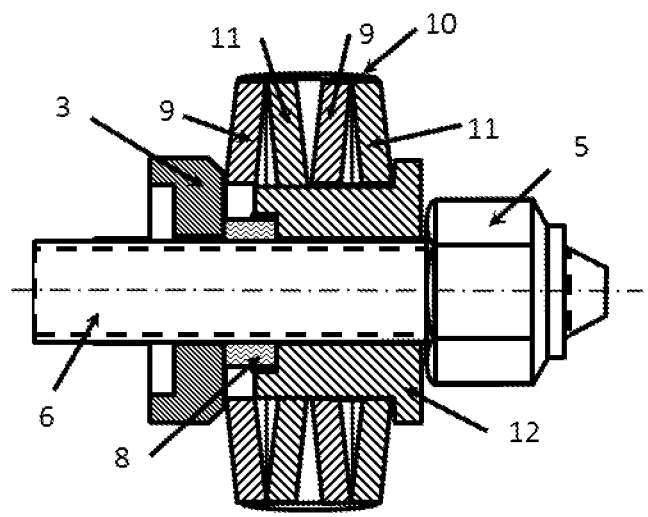
FIG. 7 shows the Device of this patent petition document with the arrangement of 2 pairs of Belleville washers, each pair installed concave face against concave face.

FIG. 7 show one of the multiple possibilities for installation of Belleville washers in the Device (4) of this patent petition document. There are two pairs of washers, each pair facing their concave faces, and with which it can extend the range of elongation between the head of the bolt (7) and its nut (5).

Figure 8:
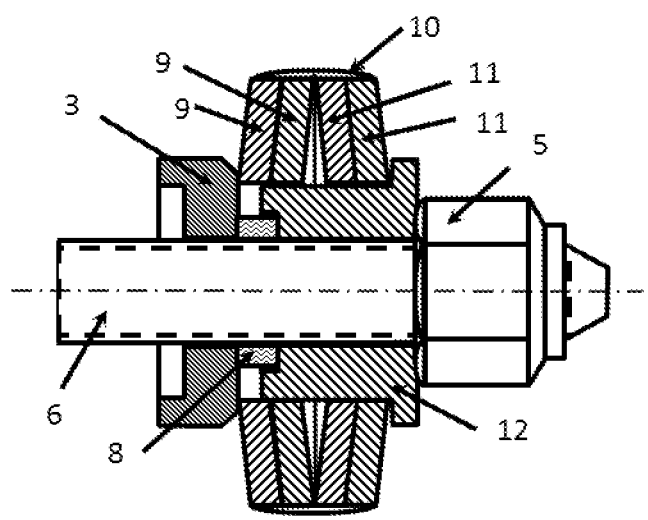
FIG. 8 shows the Device of this patent petition document with the arrangement of 2 pairs of Belleville washers, in a disposition of concave face against convex face-concave face against concave face-concave face against convex face.

FIG. 8 show one of the multiple possibilities for installing Belleville washers in the Device (4) of this patent petition document. There are two pairs of washers, each pair faces the concave face with the convex face of two washers, and both pairs of washers interact with each other through their concave faces.

Figure 9:
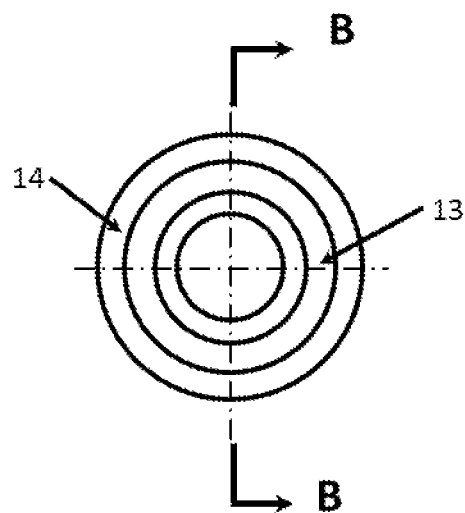
FIG. 9 shows the front view of a design variation for the adjustment jacket between the bolt and the Belleville washers.
Figure 10:
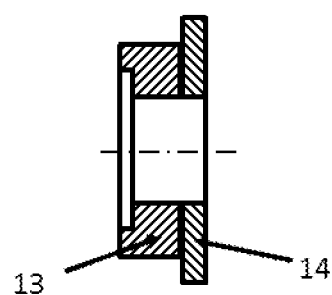
FIG. 10 shows the profile view in section B-B of a design variation for the adjustment jacket between the bolt and the Belleville washers.

FIG. 9 and FIG. 10 show a variation for the design of the jacket (12), replacing it by another jacket without flange (13) and a washer (14).

The invention claimed is:

1. A device for preventing spillage from an inside of mining mills and maintaining the sealing of fastening bolts of the mill's linings, where a first end of at least one of the fastening bolts holds the linings and a second end of the at least one fastening bolt is fastened to a mill body by a nut that locks the bolt, and a washer is disposed between the mill body and the nut, preventing material leakage, the device comprising: one or more pairs of Belleville washers in an annular space of which is installed a jacket with a housing with an inner seal, the jacket having a flange with a diameter to allow an action of a nut which allows centering and compressing of the Belleville washers, wherein the Belleville washers are assembled together in series by their external perimeters and the device is located between the washer and the nut of the fastening bolts.

2. The device of claim 1, wherein the Belleville washers are assembled with a concave face against a convex face or a concave face against a concave face.

3. The device of 1, wherein the inner seal is made of natural or synthetic elastomer material.

4. The device of claim 1, wherein the Belleville washers are assembled by a perimeter seal.

5. The device of claim 4, wherein the perimeter seal is made of natural or synthetic elastomer material.

6. The device of claim 1, wherein the housing of the jacket has an outer diameter smaller than the annular space of the Belleville washers and a length greater than or equal to a length of the Belleville washers when compressed.

* * * * *